L. POTIER.
TRAWL TUB.
APPLICATION FILED JAN. 8, 1917.
1,221,904.
Patented Apr. 10, 1917.
4 SHEETS—SHEET 1.
FIG. I
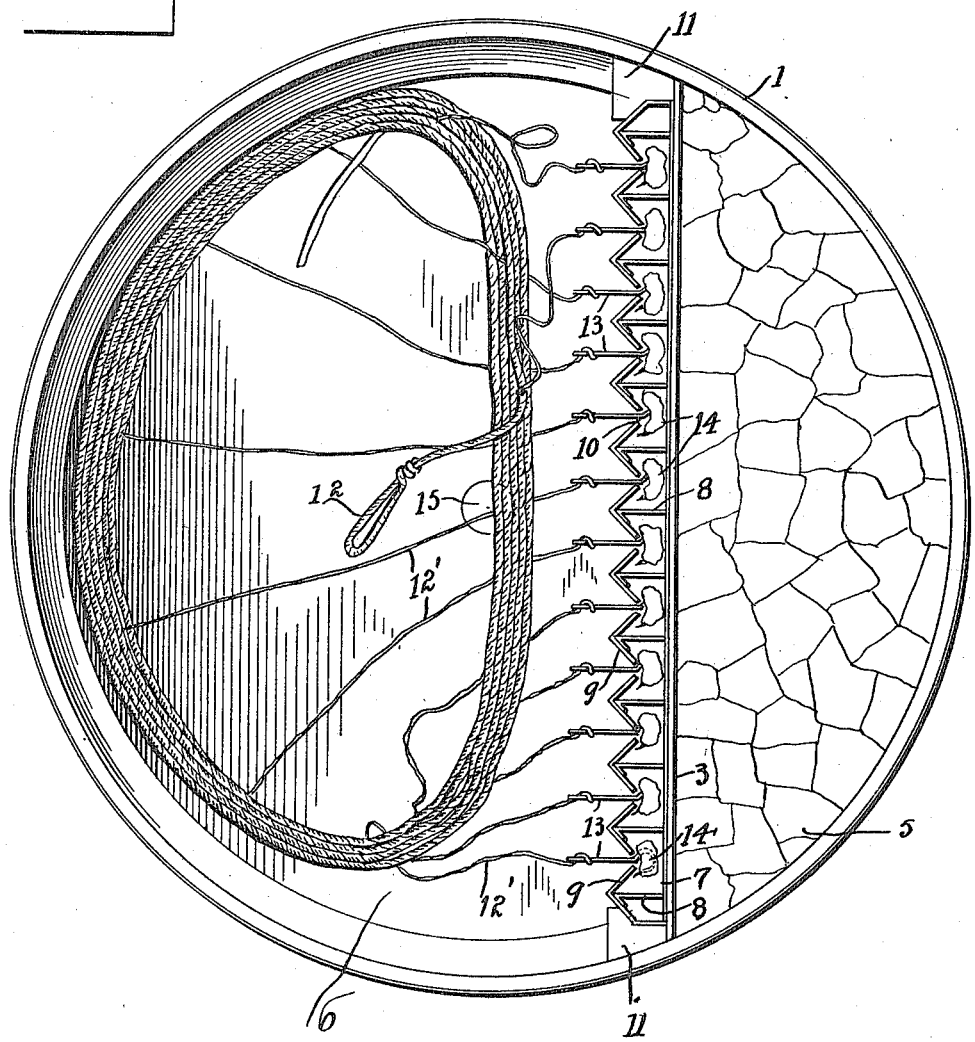
Louis POTIER
Inventor
By
Attorneys

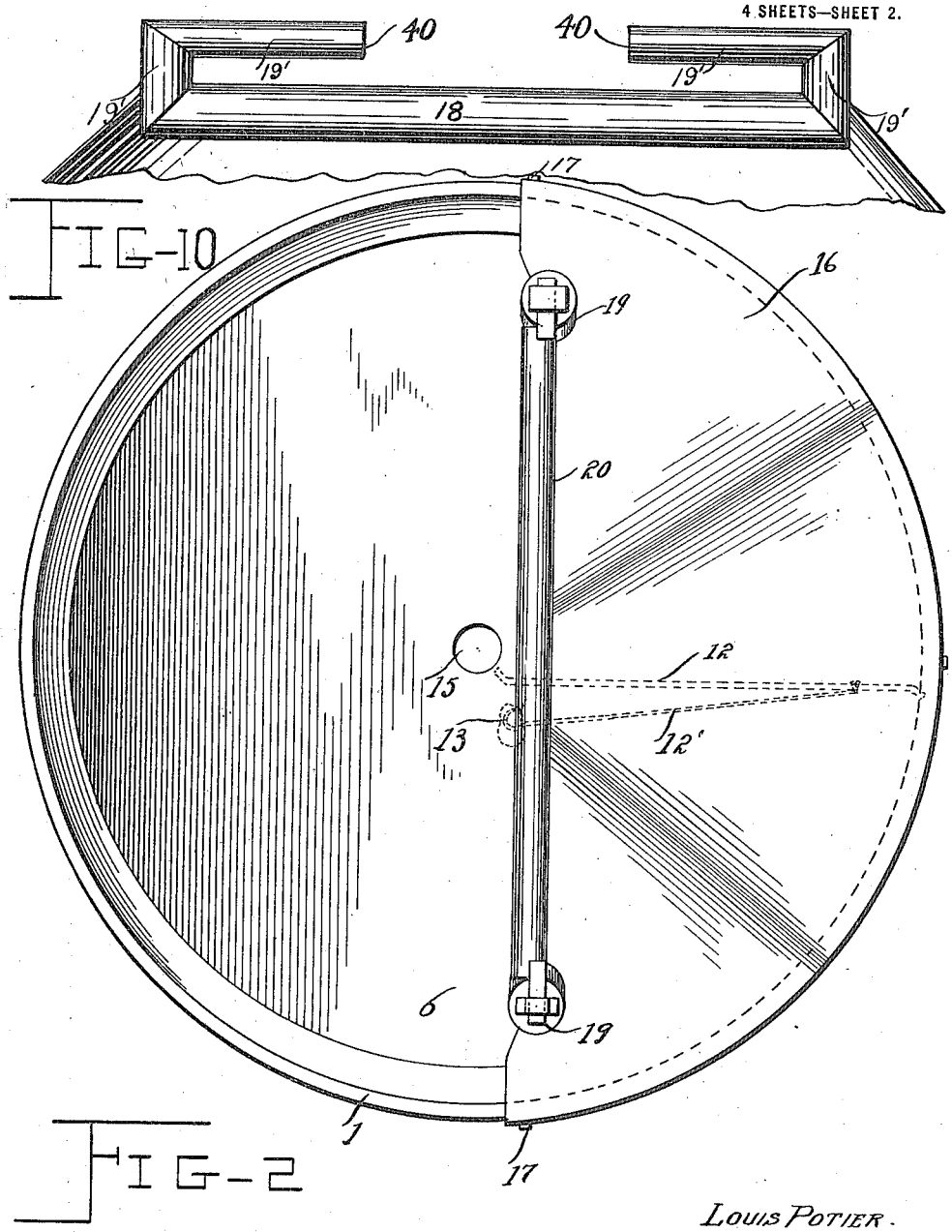

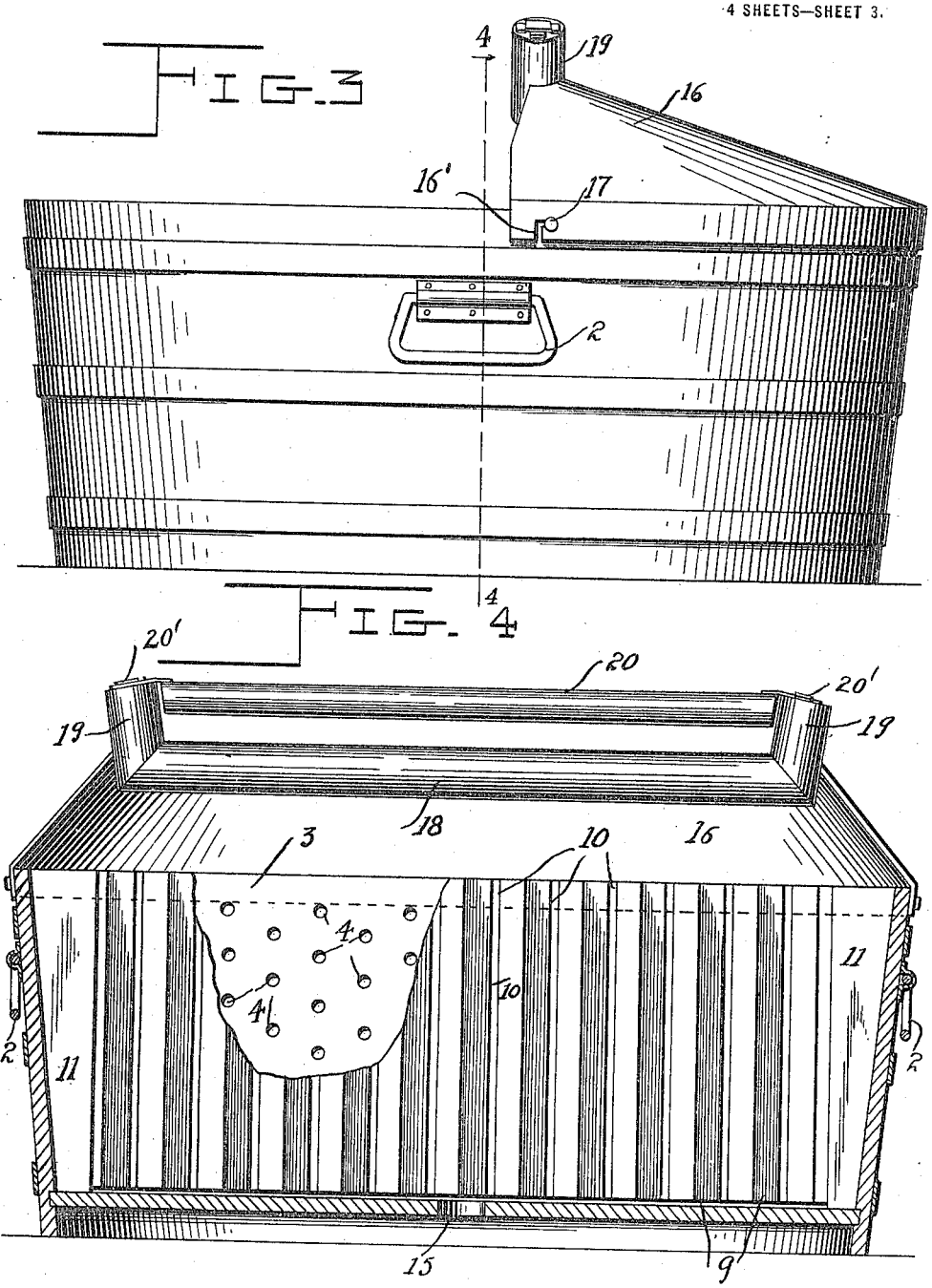

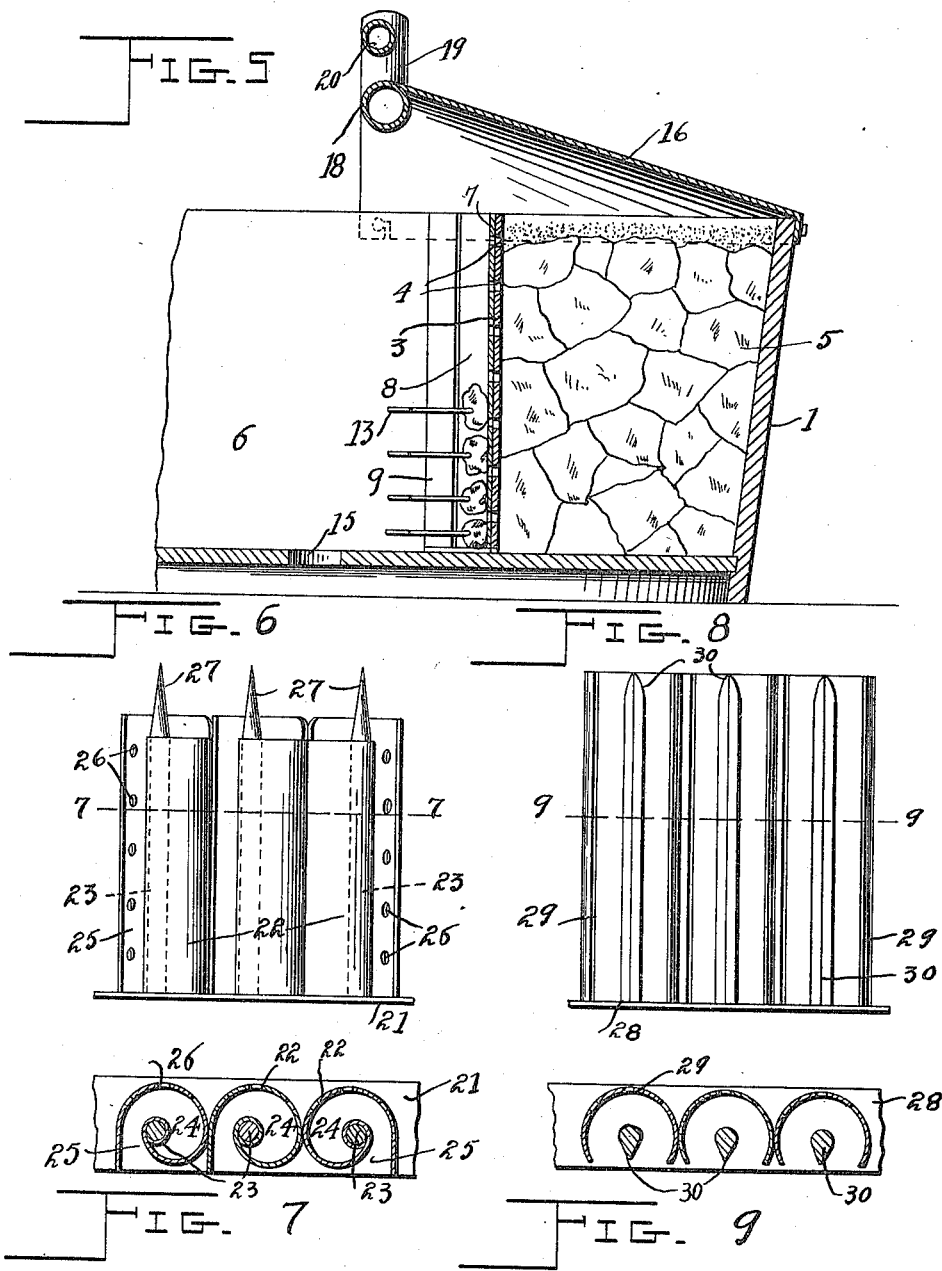

UNITED STATES PATENT OFFICE.

LOUIS POTIER, OF YARMOUTH, NOVA SCOTIA, CANADA.

TRAWL-TUB.

1,221,904.     Specification of Letters Patent.     Patented Apr. 10, 1917.

Application filed January 8, 1917. Serial No. 141,121.

*To all whom it may concern:*

Be it known that I, LOUIS POTIER, a subject of the King of Great Britain, residing at Yarmouth, Province of Nova Scotia, Canada, have invented certain new and useful Improvements in Trawl-Tubs; and I do hereby declare that the following is a full, clear, and exact description of the invention, such as will enable others skilled in the art to which it appertains to make and use the same.

The present invention relates to trawl tubs, boxes or the like and more particularly to means for keeping the bait and trawl lines arranged within the tub, and an object of the invention is to provide a tub of this character whereby the trawl line and bait may be properly contained therein so that the trawl line may be automatically fed from the tub without any special manipulations.

A further object of the invention is to provide a trawl tub wherein the bait carried by the trawl line may be kept separated from the line and gangings and that the bait may be preserved for a greater length of time.

With the above and other objects in view which will hereinafter appear as the description continues, the invention consists of the novel features of construction and the formation of parts as will be hereinafter more fully described and particularly pointed out in the appended claims.

In the accompanying drawings is shown the simple and preferred form of the invention it being, however, understood that no limitation is necessarily made to the precise structural details herein exhibited but the right is hereby reserved to any changes or alterations that may be had and come within the scope of the invention without departing from the spirit thereof or sacrificing the efficiency of the same.

In the accompanying drawings;

Figure 1 is a plan view of the tub embodying the invention having its cover removed and showing the trawl line with the bait attached thereto in position;

Fig. 2 is a plan view of the tub with the trawl line removed and the line delivering device applied to the tub;

Fig. 3 is a side elevation of the same;

Fig. 4 is a vertical transverse section taken on the line 4—4 of Fig. 3;

Fig. 5 is a detail vertical section;

Fig. 6 is a detail elevation of a slightly modified form of the bait retaining members;

Fig. 7 is a horizontal section of the same taken on the line 7—7 of Fig. 6;

Fig. 8 is another slightly modified form of a bait holding device;

Fig. 9 is a horizontal section of the same taken on the line 9—9 of Fig. 8; and, Fig. 10 is a slightly modified form of a guide used in connection with the invention.

Referring now more particularly to the drawings wherein like and corresponding parts are designated by similar reference characters throughout the several views.

The numeral 1 indicates a trawl tub of the usual construction to which may be applied an air-tight cover, the latter not being shown, whereby the contents of the tub may be protected from high temperature which would impair the bait contained within the tub 1. Whereas in the drawings I have shown a trawl tub 1 it is of course to be understood that a trawl box or the like may be used and the box or tub may be of such a depth as to hold the bait and line according to the length of the trawl line. Secured to each side of the tub 1 are handles 2 by which the same may be carried from place to place. Arranged within the tub is a partition 3 having a plurality of perforations 4 therein which divides the tub into a refrigerating compartment 5 and a trawl line holding compartment 6. Adapted to be arranged in front of the partition 3 is a perforated plate 7 having extending therefrom the extending partitions 8 and these partitions have secured to their outer edges vertically extending members 9 V shaped in cross section as better shown in Figs. 1 and 4, and held in spaced relation so as to provide the vertically extending slots 10. A pair of vertically arranged cleats 11 are adapted to be positioned within the tub and to which is connected the plate 7 for holding the same in place and the vertical compartments arranged between the partitions 8 in front of the plate 7 are for holding the bait so that the latter will be held adjacent to the compartment 5 in which the ice and salt may be contained. The trawl line 12 as shown may consist of any number of skates each having extending therefrom the snoods 12' to which are connected the hooks 13 having the bait 14 attached thereto. In placing the trawl line within the tub the hooks are first baited and are placed in the vertical compartments so that the bait will be held adjacent to the refrigerator and the trawl line may be placed within the compartment 6 as better shown in Fig. 1. The hooks 13 may be arranged one upon the other as better illustrated in Fig. 5 so that a large number of baited hooks may be stored within the compartments adjacent the refrigerator. By so separating the bait from the refrigerator compartment the same will be kept dry and prevented from becoming wet and slimy but at the same time the ice within the compartment 5 will keep the bait cool and preserve the same so that it will be kept in a better condition for a longer period of time. Arranged within the bottom of the tub is a vent hole 15 by which the water coming from the refrigerator compartment may drain through the holes within the partition 3 and then allowed to pass out of the tub through the vent hole 15. The partition 3 and the bait holder may be made of metal or other suitable material.

It is apparent from the construction as set forth that the trawl line may be baited on land or at the point of starting of the vessel which may carry the tub and the trawl line coiled within the compartment 6. When it comes to the time for the fisherman to pay out his line one end of the line may be deposited within the water and anchored in the usual manner and as the vessel proceeds carrying the tub, the line will be drawn out into the water and the respective hooks carried thereby will be caused to rise in succession through the slots 10 and subsequently allowed to drop into the water without becoming entangled with each other or the trawl line thereby permitting the trawl line to be paid out into the water without the aid of another fisherman to keep the various hooks on the lines separated.

Adapted to be placed on the tub is a semicircular cover or support 16 having a depending flange in which are arranged diametrically opposite the slots 16' for receiving the pin 17 carried by the tub whereby the support may be retained in place. The radial edge of the support is bent to form a rounded portion 18 and the ends thereof are bent upwardly to form the vertically extended portions 19. Connected to the vertical portions 19 is a rounded ledge 20 which is held in spaced relation with the rounded portion 18 and the trawl line when being paid out into the water passes through the spaces between the members 18 and 20 thereby forming a guide for delivering the trawl line from the tub, and should the vessel stop in which the tub is mounted this guide will prevent the excess trawl line from being deposited within the tub where it would become commingled with the remaining portion of the line.

In Fig. 10 of the drawings I have illustrated a slightly modified form of a guide to be used in connection with the cover 16. The rounded ledge 20 has to be removed from the vertical portions 19 by removing the securing members 20' and to avoid this I have provided the guide which is shown in Fig. 10 wherein the vertical members 19' extend upwardly but their extremities are bent inwardly at right angles as at 40 and terminate in spaced relation so as to leave a center space between the projections 40 whereby the necessity of removing the bar 20 will be eliminated.

Should not the bait holding compartments as shown in the drawings be sufficient for holding the baited hooks additional bait compartments may be arranged around the sides of the tub or the bait holding compartments shown in Figs. 6 to 9 inclusive may be placed within the tub or substituted for that form of bait holding compartments as shown in Figs. 1, 4 and 5 of the drawings.

The bait holding compartments as shown in Fig. 6 comprise a base plate 21 upon which are arranged a plurality of partitions 22 having one edge thereof connected to the vertically extending post 23 and then coiled about the same to form the compartments 24 having outlets 25 extending therefrom in which may rest the shank portions of the hooks and the baits may rest within the compartments 24. The partitions 22 may also be perforated as at 26 so that when they are placed adjacent to the refrigerating compartment the cold air may pass through the partitions into the compartments 24. The upper extremities of the posts 23 are pointed as at 27 as better shown in Fig. 6, so that the bait and hooks may be guided out of the compartments and be readily separated.

The compartments as shown in Figs. 8 and 9 comprise a base portion 28 having a plurality of vertically extending partitions 29 which are substantially semicircular in cross section and have perforations arranged therein. Each of these partitions substantially encircles one of the vertical posts 30 which are carried by the base plate 28 and are substantially pear shaped in cross section having upper ends terminating in points as shown. By the particular construction of the compartments shown in Figs. 6 to 9 inclusive a large number of baited hooks may be stored therein and at the same time be automatically fed therefrom when the trawl line is paid out into the water.

Having thus fully described my invention, what I claim as new and desire to secure by Letters Patent is:

1. A trawl tub comprising a receptacle, a perforated partition for dividing said receptacle into compartments, and bait holding compartments formed adjacent said partition.

2. A device of the character described comprising a tub, a partition arranged within said tub, a plurality of compartments formed adjacent said partition, and means whereby baited hooks may be arranged within said compartments.

3. A trawl tub comprising a receptacle, a perforated partition for dividing said receptacle into refrigerating and trawl line holding compartments and a plurality of vertically arranged compartments arranged adjacent said partition.

4. A trawl tub comprising a receptacle, a perforated partition dividing said receptacle into compartments, a plurality of vertical compartments arranged adjacent said partition, and each of said compartments having a vertically arranged slot communicating therewith for the purpose set forth.

5. A trawl tub comprising a receptacle, a perforated plate for dividing said receptacle into compartments, a plurality of vertically arranged curved plates extending from said partition, a vertically extended post substantially pear shaped in cross section carried within each of said first mentioned plates for forming compartments and the edges of said plates being held in spaced relation to form vertically extending slots communicating with said compartments for the purpose set forth.

In witness whereof I have hereunto set my hand.

LOUIS POTIER.

Witnesses:
NELLIE M. DOUCETTE,
MARGARET G. HATFIELD.

Copies of this patent may be obtained for five cents each, by addressing the "Commissioner of Patents, Washington, D. C."